Feb. 12, 1924.

Re. 15,758

R. GIBBONS

AIRPLANE RECEIVING APPARATUS

Original Filed Aug. 15, 1919

5 Sheets-Sheet 1

INVENTOR

Richard Gibbons

BY

Prindle, Wright Neal & Bean

ATTORNEYS

Feb. 12, 1924.

R. GIBBONS

Re. 15,758

AIRPLANE RECEIVING APPARATUS

Original Filed Aug. 15, 1919 5 Sheets-Sheet 2

INVENTOR
Richard Gibbons
BY
Trimble, Wright Neal & Bean
ATTORNEYS

Feb. 12, 1924. Re. 15,758

R. GIBBONS

AIRPLANE RECEIVING APPARATUS

Original Filed Aug. 15, 1919 5 Sheets-Sheet 3

INVENTOR
Richard Gibbons
BY
Prindle, Wright Neal & Dean
ATTORNEYS

Feb. 12, 1924. Re. 15,758

R. GIBBONS

AIRPLANE RECEIVING APPARATUS

Original Filed Aug. 15, 1919 5 Sheets-Sheet 4

INVENTOR
Richard Gibbons
BY
Prindle, Wright Neal & Dean
ATTORNEYS

Feb. 12, 1924.

R. GIBBONS

Re. 15,758

AIRPLANE RECEIVING APPARATUS

Original Filed Aug. 15, 1919

5 Sheets-Sheet 5

INVENTOR
Richard Gibbons
BY
Prindle, Wright, Neal & Beam
ATTORNEYS

Reissued Feb. 12, 1924. Re. 15,758

UNITED STATES PATENT OFFICE.

RICHARD GIBBONS, OF BROOKLYN, NEW YORK, ASSIGNOR TO MARY A. KENNEY, OF BROOKLYN, NEW YORK.

AIRPLANE-RECEIVING APPARATUS.

Original No. 1,437,236, dated November 28, 1922, Serial No. 317,672, filed August 15, 1919. Application for reissue filed December 14, 1923. Serial No. 680,771.

*To all whom it may concern:*

Be it known that I, RICHARD GIBBONS, a citizen of the United States, residing at Brooklyn, in the county of Kings and State of New York, have invented a certain new and useful Airplane-Receiving Apparatus, of which the following is a specification.

The invention has for an object to provide an apparatus adapted to receive an airplane, drop-carriage or the like and of such character that the airplane may travel safely along such apparatus.

A further object is to construct an apparatus of the above nature in such a manner as to produce sudden changes in the velocity of an airplane within a limited space, for instance, to enable an airplane to land upon a building or ship.

Other objects are to provide such an apparatus which will be adjustable to receive airplanes approaching from different directions or elevations and which, as far as possible will prevent accidents and injuries to the machine or operator during the landing operation.

Further objects and advantages of the invention will be, in part, obvious; and in part specifically pointed out in the description hereinafter contained, in which is disclosed an apparatus made in accordance with the invention and designed to effect the landing of an airplane. It will be obvious, however, that relatively reversed movements between the apparatus and airplane, would adapt the apparatus to assist in starting an airplane within a limited space. The present embodiment of the invention is, therefore, to be considered merely as illustrative of its principle. In the drawings.

Figure 7:
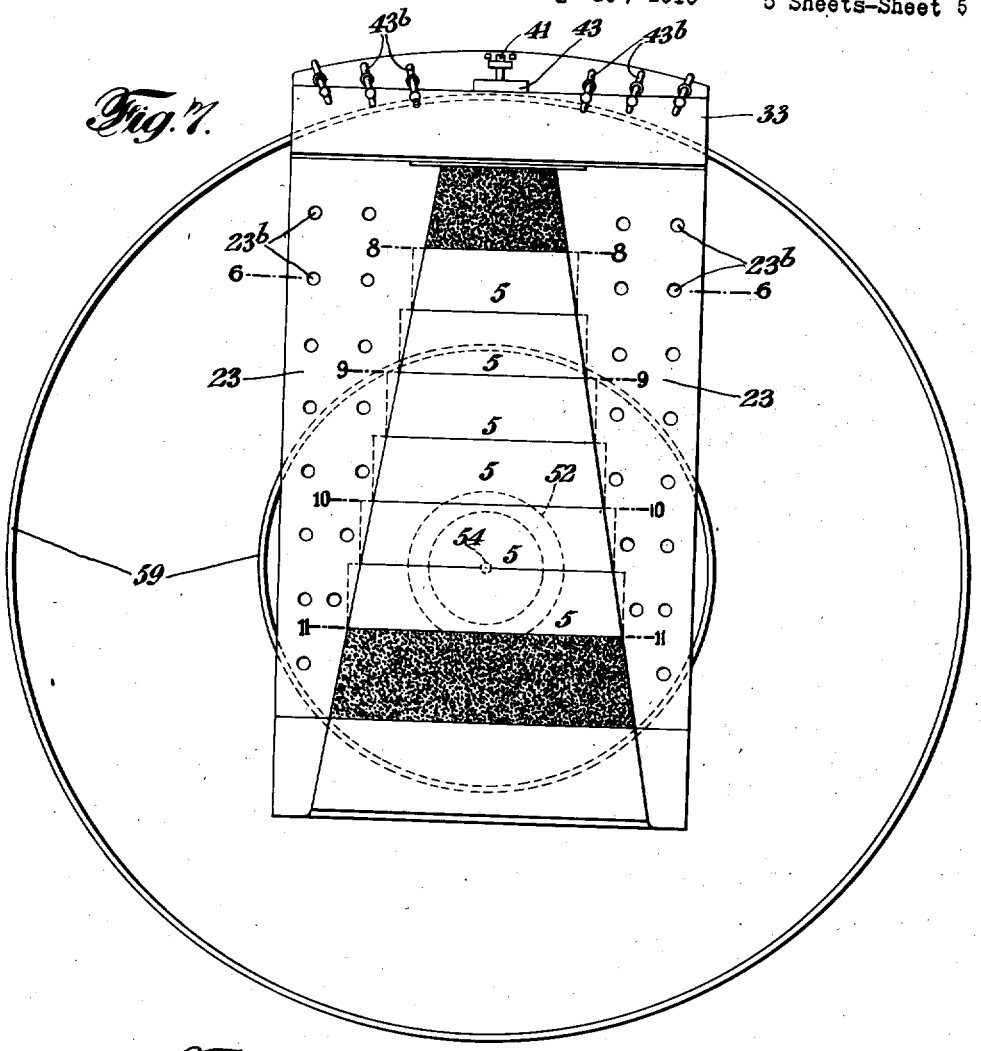
Fig. 7 is a plan view of the apparatus.

Figs. 8 to 11 are somewhat diagrammatic views taken respectively on line 8—8, line 9—9, line 10—10, line 11—11 of Fig. 7, and showing the contour of the side guides of the apparatus.

Figure 1:
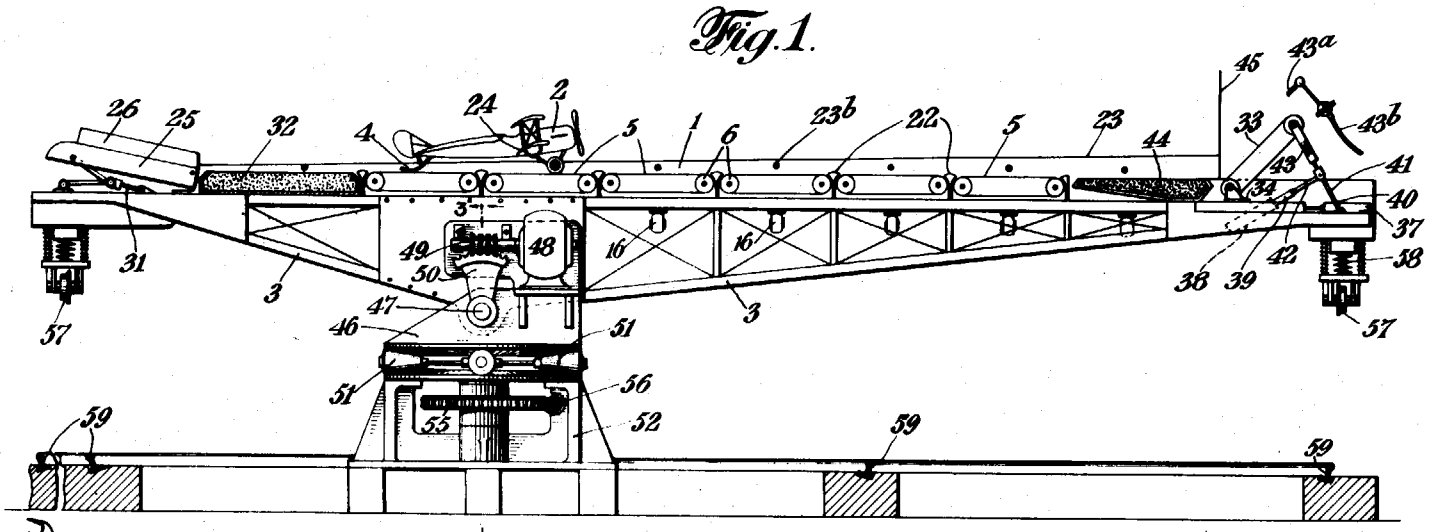
Fig. 1 is a side elevation of an apparatus made in accordance with the invention, certain of the parts appearing in section.

The apparatus is provided with a suitable runway 1 (Figs. 1, 6, and 8 to 11) of relatively extended length, which is adapted to receive an airplane 2 shown conventionally in Fig. 1, and permit the airplane to move along the runway. The runway is supported by any suitable frame work 3, which may be formed of structural steel members, as illustrated.

In order to assist in bringing an airplane to rest within the runway, the airplane supporting surface thereof is preferably caused to move in a direction opposite to the direction of movement of the airplane along the runway, whereby the tail skid 4 of the airplane, or any other suitable frictional surface, will bear against the moving surface of the runway, and the high relative velocity between the two elements will be effective to bring the airplane to rest in an exceedingly short space of travel. In the present embodiment of the invention, this movable supporting surface of the runway takes the form of a series of continuous traveling webs 5, which constitute the bottom of the runway, and are appropriately driven from sprocket wheels 6 and 7, engaging with lugs 8 (Fig. 2) on the webs 5.

Figure 2:
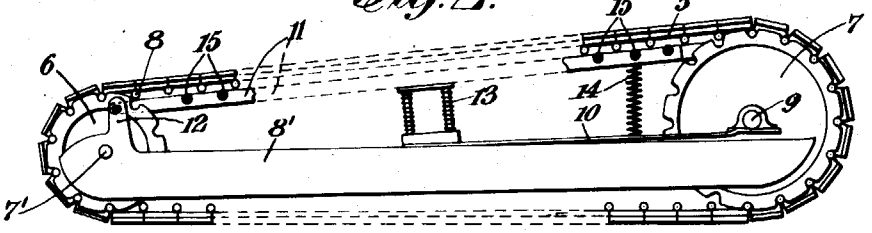
Fig. 2 is a detail view of a traveling web adapted to be used in the construction shown in Fig. 1.

If desired, devices may be employed in connection with the webs 5 to prevent them from sagging under the weight of an airplane. As shown in Fig. 2, the sprocket wheels 6 may be journaled by means of shaft 7′ in a bed plate 8′ around which the web 5 passes, while the shaft 9 for the wheels 7 is resiliently mounted upon leaf springs 10. With a construction of this nature a certain amount of resilience is provided in the apparatus to take up the shock of impact of the airplane upon the web. Furthermore, a table 11 may be provided to bear against the under surface of the portion of the web 5 which supports the airplane, in order to maintain such web approximately plane. In the present instance, such table 11 is pivoted to lugs 12 carried by the bed plate 8′, and suitable spring devices, 13 and 14, press against the table 11 to force it against the web. Antifriction rollers 15 may be provided between the web 5 and table 11, if desired. In this way the webs will not be subjected to undue strains when an airplane passes over them, and yet the surface of the runway formed by the series of webs, will be approximately level.

Figure 6:
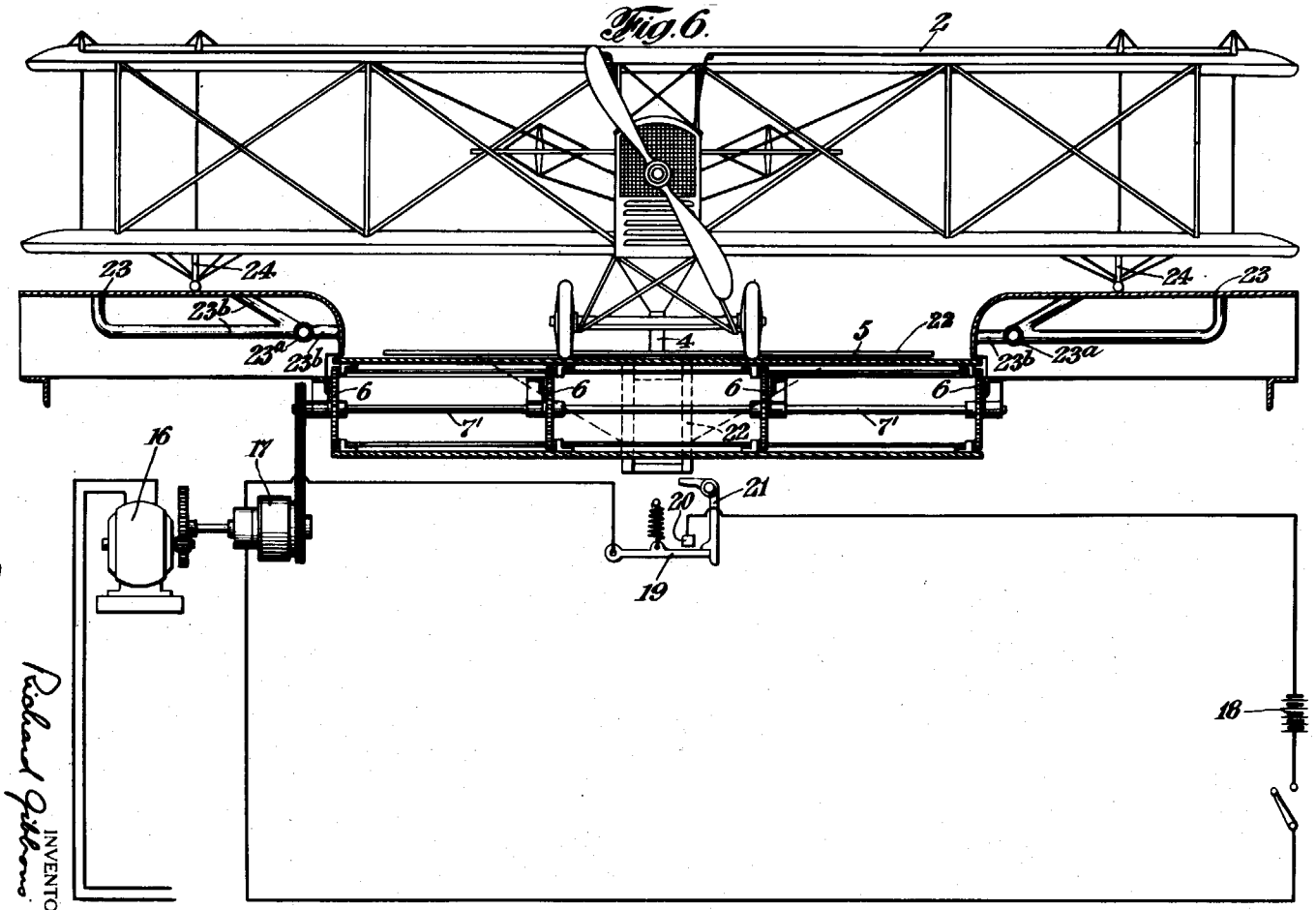
Fig. 6 is a sectional view on line 6—6 of Fig. 7.

In the form of the invention illustrated, the traveling webs 5 are driven from individual motors 16, suitably carried by the frame work 3, and tripping devices are employed to stop the webs after the airplane has passed thereover. Referring more particularly to Fig. 6, the webs may be driven from a motor 16 through a magnetic clutch 17, included in a circuit comprising a source of energy 18 and a circuit closer 19, normally held away from contact 20, by means of a latch 21.

The magnetic clutch 17 is, therefore, normally inactive, but when an airplane passes over for instance the second succeeding web 5 after the web desired to be stopped, either the wheels or tail skid of the airplane will depress a reciprocable actuating member 22 disposed between the webs, and such member 22 will trip the latch 21 which is in the circuit corresponding to the web desired to be stopped, thus closing circuit to magnetic clutch 17 and disconnecting the drive from such web. The motor 16 in the present form is intended to be manually thrown in and out by an attendant.

The motors 16 are preferably run at progressively increasing speeds toward the far end of the runway, or geared at a higher ratio to their corresponding webs, in order that the webs which the airplane engages successively as it moves toward the farther end of the runway, will move at progressively increasing speeds. In this way the braking action of the webs upon the airplane is brought into play gradually and with progressively increasing effect.

In combination with the runway 1, there may be employed suitable side guides 23, adapted to underlie the planes of the airplane and assist in maintaining the airplane within the runway 1 or guide it to said runway, in case the airplane should alight improperly upon the apparatus. In case the airplane should tend to rock within the runway, the skids 24 upon its wings will engage the upper surfaces of side guides 23, and tend to restore the airplane to horizontal position.

Figure 8:
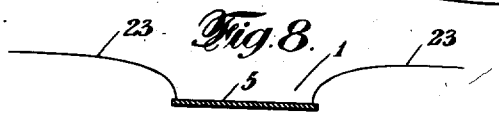
Figure 9:
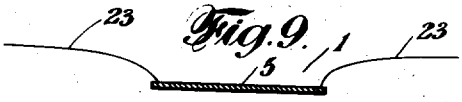
Figure 10:
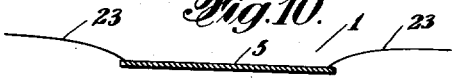
Figure 11:
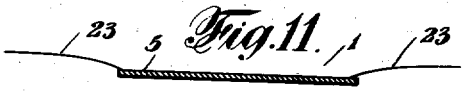

As shown more fully in Figs. 7 to 11, the curvature of the side guides 23 becomes sharper toward the far end of the runway, and the runway and side guides converge toward this same end of the apparatus. Fig. 11 shows the contour of the side guides at the entrance end of the apparatus, the curvature of the side guides being comparatively slight, so that an airplane landing upon one of the guides may be readily directed into runway 1. As the airplane passes along the runway, however, the sharper curvature of guides 23, (as indicated in Figs. 10, 9 and 8) tends to guide the airplane more abruptly into the runway; the final curvature indicated in Fig. 8 being preferably so sharp as to substantially confine the airplane within the runway at that point. The walls of side guides 23 adjacent to the runway should, however, be low enough to clear the hubs of the airplane wheels. As shown in Fig. 7 the width of the traveling webs 5 progressively decreases toward the far end of the runway, the adjacent walls of the guides 23 overhanging the sides of each web to a certain extent.

The side guides 23 may be provided with conduits $23^a$ connected to passages $23^b$ which lead to the surfaces of said side guides. When the apparatus is being used for landing purposes, the conduits $23^a$ may be employed as suction conduits to rarify the air above the side guides and assist in drawing down the wings of the airplane to, or maintaining the same in proper position. In case the apparatus is being used for starting purposes, the conduits may be employed as pressure conduits to elevate the airplane wings and thus assist in lifting the airplane from off the apparatus.

Figure 4:
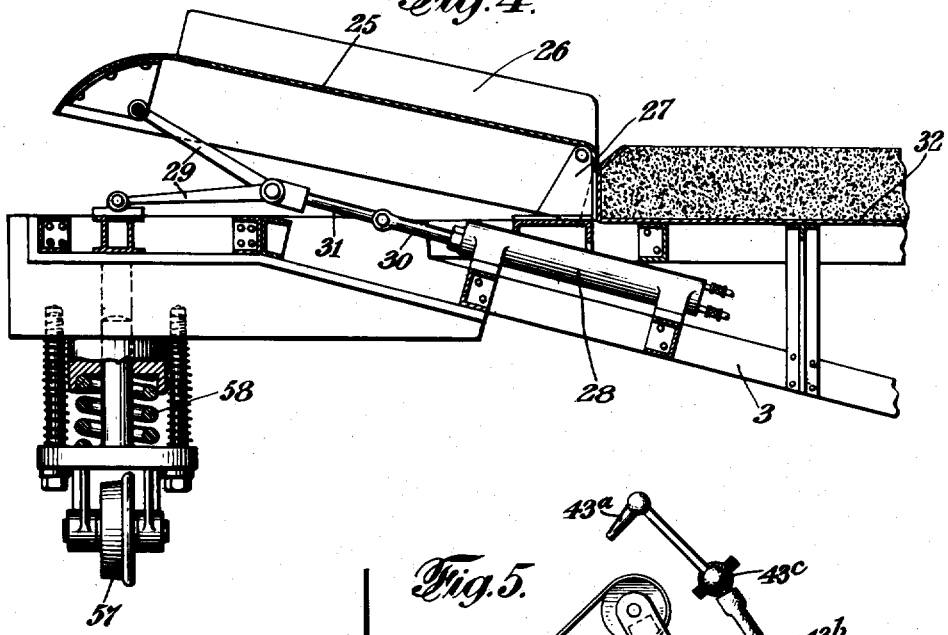
Figs. 4 and 5 are detail views partly in section respectively of left and right hand ends of the structure shown in Fig. 1.

Referring more particularly to Figs. 1 and 4, the entrance end of the apparatus may be provided with a suitable ramp 25, having side guides 26, similar to the members 23 previously described, such ramp being preferably adjustable to different inclinations to accommodate itself to airplanes approaching the apparatus at different elevations. In the present construction the ramp 25 is pivoted to lugs 27 on the framework 3 of the apparatus, and a pneumatic cylinder 28 may be actuated to open or close toggle links 29 to adjust the ramp, through piston rod 30 and an arm 31 pivoted between rod 30 and the links 29. A box 32 containing tan bark or similar loose material may be interposed between the ramp 25 and the runway 1, to impart a deadening effect to the airplane as it comes on to the apparatus.

Figure 5:
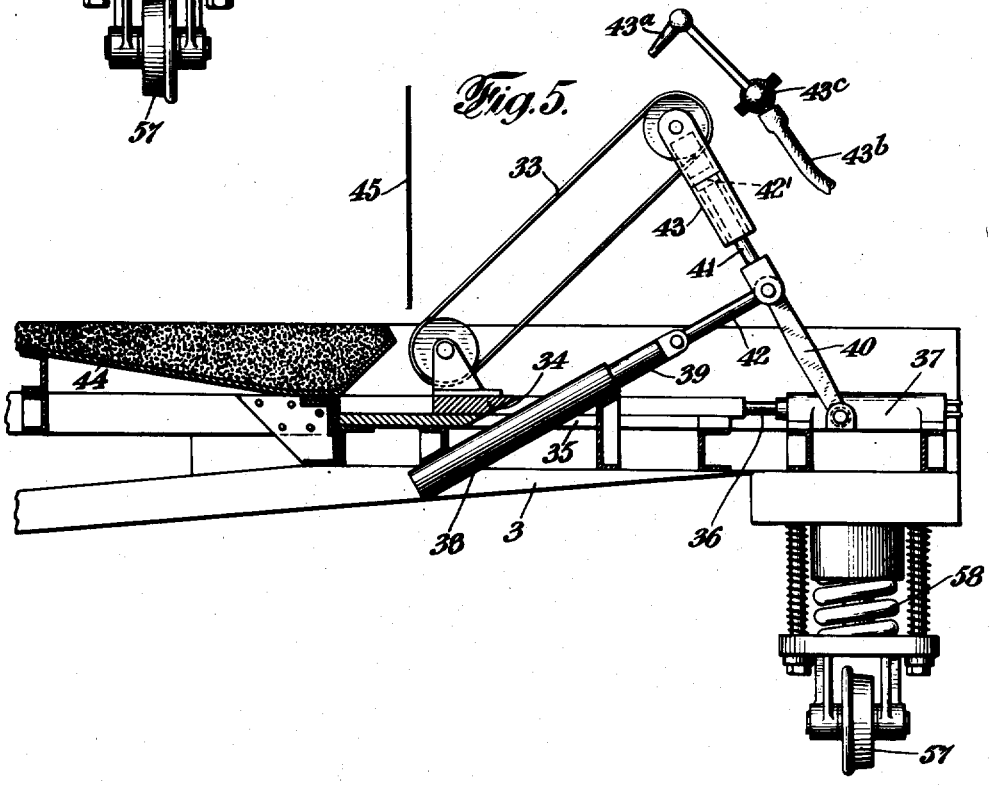

The runway 1, beyond the traveling webs 5, and at its far end, may be provided with suitable devices to stop the airplane in case the latter has not been brought to rest properly in passing over the webs 5. As shown in Figs. 1 and 5, an inclined traveling web 33, which may be in general similar to the webs 5, is disposed at the far end of the apparatus and rotated and driven so that its upper surface moves downwardly, thus tending to prevent an airplane from riding upwardly along the web and passing off from the apparatus. The web 33 may be carried upon a slidable plate 34 mounted on guides 35 (Fig. 5), thus permitting the web 33 to slide backwardly under the impact of an airplane. A piston rod 36 is shown in Fig. 5 as connected to plate 34, and such piston rod works within a pneumatic recoil cylinder 37 carried by the frame work 3, the web 33 and associated parts thus constituting a recoil device for the airplane. A further pneumatic cylinder 38, may be operated to change the inclination of web 33, through piston rod 39, toggle links 40 and 41, and intermediate pivoted arm 42; link 41 may also be provided with a piston 42′ working within a cylinder 43, to provide a yieldable support for the upper end of web 33. In Figs. 1 and 5 there is also shown a box 44 interposed between the runway and web 33, which box may contain sand or similar loose material to deaden the motion of an airplane toward web 33; a screen 45, if desired, may also be employed to enmesh the airplane propeller in case the latter moves beyond the sand box 44, and stop rotation of the propeller.

If desired, a series of nozzles 43ᵃ, supplied with air under high pressure through flexible pipes 43ᵇ may be supported in any suitable manner adjacent the outer end of web 33, whereby the air pressure from such nozzles may act upon the surfaces of an airplane to tend to prevent the same from rising on the web 33 and passing off the runway, during a landing operation. In order that such nozzles may not interfere with the passage of an airplane over the web 33 in starting, they are preferably adjustably mounted, for instance by the ball and socket connection 43ᶜ (Fig. 5) whereby the nozzles may be moved out of the way during a starting operation.

The apparatus is preferably so constructed as to be turned in a substantially horizontal plane, to accommodate itself to airplanes approaching from different directions, and the inclination or tilt of the runway is also preferably adjustable so as to cause the airplane to ride up an inclination of suitable angle, in stopping. The adjustment of the inclination of the runway is accomplished in the present structure by pivoting the frame work 3 to a turn table 46 by means of a shaft 47 fixed to the frame work and journaled in the turn table. A motor 48, mounted on the turn table, turns a worm 49, which latter engages with a worm gear segment 50 fixed to the shaft 47, so that by rotating motor 48, the apparatus may be tilted to any desired inclination. In the present form the pivot is located at one side of the center of frame work 3 thus enabling a greater inclination to be obtained with a given amount of space available beneath such frame work.

Figure 3:
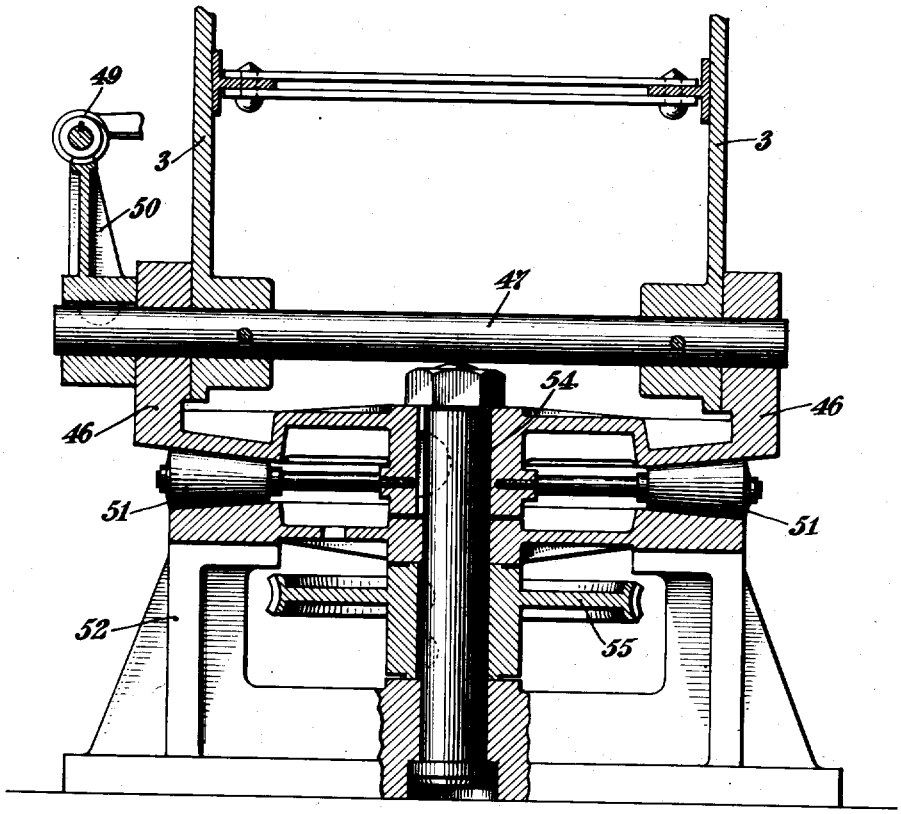
Fig. 3 is a section on line 3—3 of Fig. 1.

To adjust the axis of the runway in a horizontal plane, to accommodate airplanes coming from different directions, the turn table 46 is mounted over suitable rollers 51 (Fig. 3) between the turn table and a fixed base 52, and a shaft 54, fixed to turn table 46, and journaled within base 52, is driven by a worm gear 55, from a worm 56 (Fig. 1) rotatable by suitable source of power (not shown) which may be a motor similar to motor 48 previously described. Thus the runway may be turned to extend in any desired direction, whereby the airplane may be landed or started according to the direction of the wind.

In adjusting the direction in which the longitudinal axis of the runway extends, either end of the apparatus may be tilted until rollers 57 mounted beneath the respective ends of the apparatus and carried by suitable shock absorbing devices 58, come into engagement with circular tracks 59, or either end of the apparatus may rest on such tracks during use.

It will be understood that suitable heating pipes or coils (not shown) may be employed to prevent snow or ice from interfering with the operation of the apparatus.

While a specific embodiment of the invention has been described, it will be obvious that many changes may be made therein without departing from the spirit of the invention, as defined in the following claims:

I claim:

1. An airplane receiving apparatus comprising a runway adapted to receive an airplane, and means for moving the airplane supporting surface of said runway in a plane substantially parallel to the direction of movement of an airplane along said runway, said means being operative to move the portions of said runway adjacent one end thereof at speeds progressively greater than the speeds at which the portions of the runway at the other end are moved.

2. An airplane landing apparatus comprising a runway adapted to receive an airplane, said runway having a movable airplane supporting surface, and means for moving said surface in a direction opposite to the direction of movement of an airplane along said runway, said means being operative to move the portions of said runway adjacent one end thereof at speeds progressively greater than the speeds at which the portions of the runway at the other end are moved.

3. An airplane landing apparatus comprising a runway having a series of continuous traveling webs adapted to receive an airplane, means for moving said webs in a direction opposite to the direction of movement of an airplane along said runway, and at speeds progressively increasing toward the far end of the runway.

4. An airplane landing apparatus comprising a runway having a series of continuous traveling webs adapted to receive an airplane, means for moving said webs in a direction opposite to the direction of movement of an airplane along said runway, and an automatic tripping device adapted to stop one of said webs after an airplane has passed thereover.

5. An airplane receiving apparatus comprising an elongated runway having guides extending along opposite sides thereof, said guides being of such height as to engage relatively closely under the wings of an airplane passing over the runway to assist in righting the plane and maintaining the same on said runway.

6. An airplane receiving apparatus comprising a runway adapted to receive an airplane, in combination with side guides adapted to underlie the planes of an airplane, tending to position the airplane properly in said runway, and means for withdrawing air from the space above the side guides.

7. An airplane receiving apparatus comprising a runway adapted to receive an airplane, in combination with side guides adapted to underlie the planes of an airplane, tending to position the airplane properly in said runway, said guides having conduits leading to the surfaces thereof, and an air suction device connected to said conduits.

8. An airplane receiving apparatus comprising a runway adapted to receive an airplane, in combination with side guides adapted to underlie the planes of an airplane, said side guides having curved surfaces directed toward the airplane supporting surface of the runway but with sharper curvature toward the far end of the runway.

9. An airplane receiving apparatus comprising a runway adapted to receive an airplane in combination with side guides adapted to underlie the planes of an airplane, tending to position the airplane properly in said runway, and side guides gradually converging toward the far end of the runway.

10. An airplane receiving apparatus comprising a runway adapted to receive an airplane, in combination with side guides adapted to underlie the planes of an airplane, said side guides having curved surfaces directed toward the airplane supporting surface of the runway, but with sharper curvature toward the far end of the runway, said runway and side guides gradually converging toward the far end of the runway.

11. In an airplane receiving apparatus, a continuous traveling web adapted to support an airplane, driving cylinders therefor, a supporting table underlying the portion of the web which supports the airplane, and means for yieldingly pressing said table against such portion.

12. An airplane receiving apparatus having a runway adapted to receive an airplane, a movable ramp adjacent to one end of said runway, and means for adjusting the angle of inclination of said ramp to the runway.

13. An airplane receiving apparatus having a runway adapted to receive an airplane, a recoil device at the far end of the runway adapted to absorb the force of impact of the moving airplane, said device comprising a reciprocally mounted platform, and a pneumatic piston and cylinder connected to said platform.

14. An airplane receiving apparatus having a runway adapted to receive an airplane, a recoil device at the far end of the runway adapted to absorb the force of impact of a moving airplane, said device comprising a reciprocably mounted platform, a pneumatic piston and cylinder connected to said platform, and an inclined, downwardly moving web carried by said platform.

15. An airplane receiving apparatus having a runway adapted to receive an airplane and an inclined downwardly traveling web located adjacent to the far end of the runway, and adapted to engage an airplane passing from the runway.

16. An airplane receiving apparatus comprising a runway, a framework carrying said runway, said framework being pivoted between its ends to swing in a substantially vertical plane, and mechanism adjacent said pivot for adjusting the inclination of said runway.

17. An airplane receiving apparatus comprising a runway adapted to receive an airplane, a frame work carrying said runway, a support for said frame work rotatable in a substantially horizontal plane, means permitting tilting of said framework on said support, said framework having a roller disposed adjacent to its end, and a circular track located beneath the framework adapted to engage said roller.

18. An airplane receiving apparatus comprising a runway adapted to receive an airplane, a framework carrying said runway, means for tilting said framework to adjust the runway to the desired inclination, said framework having beneath one of its ends a shock-absorbing device adapted to rest upon the structure upon which the airplane receiving apparatus is mounted.

19. An airplane receiving apparatus comprising a runway having a series of traveling webs adapted to receive an airplane, means for moving said webs in a plane substantially parallel to the direction of the movement of an airplane along said runway, and an automatic tripping device adapted to stop one of said webs after an airplane has passed thereover.

20. The combination set forth in claim 5 wherein the runway and guides converge toward one end of the runway.

21. An airplane receiving apparatus mounted to turn upon a vertical axis, means to turn the same about said vertical axis, and landing and launching means for airplanes mounted on and movable with the apparatus, and adapted to be located in proper position with regard to the direction of the wind by moving the apparatus about said vertical axis, said means including a plurality of traveling webs arranged in the same plane, and operable at different speeds.

22. In a device of the character described, traveling webs located in alinement, rollers supporting contiguous ends of the webs, means for driving the webs, and a transversely disposed member interposed between said rollers and acting to bridge the space between the contiguous ends of the webs.

23. An airplane receiving apparatus comprising a traveling web adapted to support an airplane passing thereover and to have frictional contact therewith, means for driving said traveling web, and means associated with said web for guiding an airplane on to the supporting surface of the web.

24. An airplane receiving apparatus comprising a traveling web adapted to support an airplane passing thereover and to have frictional contact therewith, means for driving said traveling web, and means associated with said web for confining the movement of an airplane passing thereover to a path substantially in alinement with the direction of motion of the web.

25. An airplane receiving apparatus comprising a traveling web adapted to support an airplane passing thereover and to have frictional contact therewith, means for driving said traveling web, and means associated with said web for guiding an airplane on to the supporting surface of the web, said means comprising guide members disposed on opposite sides of the web and converging toward the far end of the web.

26. In a construction of the character described a plurality of traveling webs located in alinement, bridging means located between the webs, and means for driving the webs independently of each other, and at different speeds.

27. In a construction of the character described a plurality of traveling webs located in alinement and arranged at an inclination, bridging means located between the webs, and means for driving each web independently in either direction substantially as and for the purpose described.

28. An airplane receiving apparatus comprising a runway adapted to receive an airplane, and means for withdrawing air from the space above said apparatus over which the planes of an airplane travel in passing along said apparatus.

29. An airplane receiving apparatus comprising a runway adapted to receive an airplane, and an air suction device together with conduits leading therefrom to the surface of the apparatus over which an airplane travels in passing along said apparatus.

In testimony whereof, I have signed my name to this specification, in the presence of the two subscribing witnesses.

Dated, December 4th, 1923.

RICHARD GIBBONS.

Witnesses:

KENNETH S. NEAL,

MAY M. MINTER.